United States Patent

Dutto et al.

[11] Patent Number: 6,059,519
[45] Date of Patent: May 9, 2000

[54] CONTAINER PALLETISER

[75] Inventors: Ivo Dutto; Alfonso Arechaga; Antonio Aragon, all of Llodio; Alfonso Garrido, Alava, all of Spain

[73] Assignees: Vidrala, S.A.; Avacon, S.A., both of Spain

[21] Appl. No.: 09/268,532

[22] Filed: Mar. 12, 1999

[51] Int. Cl.[7] .................................................. B65G 57/24
[52] U.S. Cl. ................................. 414/791.6; 414/793.4; 414/792.9
[58] Field of Search .................. 414/791.6, 793.4, 414/794.3, 792.9, 623

[56] References Cited

U.S. PATENT DOCUMENTS

| | | | |
|---|---|---|---|
| 2,468,999 | 5/1949 | Pettler | 414/623 |
| 3,022,904 | 2/1962 | Shires | 414/791.6 X |
| 3,820,667 | 6/1974 | Critchlow et al. | 414/627 |
| 3,866,780 | 2/1975 | Miller et al. | 414/623 |
| 4,260,309 | 4/1981 | Lynn | 414/793.4 X |
| 4,432,686 | 2/1984 | Feldkämper | 414/793.4 X |
| 4,746,255 | 5/1988 | Roccabianca et al. | 414/792.9 X |
| 5,215,427 | 6/1993 | Olsthoorn et al. | 414/623 X |
| 5,253,974 | 10/1993 | Williams | 414/623 |
| 5,516,255 | 5/1996 | Tygard | 414/623 X |
| 5,695,313 | 12/1997 | Grass et al. | 414/793.4 |

*Primary Examiner*—Janice L. Krizek
*Attorney, Agent, or Firm*—Bierman, Muserlian and Lucas

[57] ABSTRACT

Container palletiser, of the type that have an arm equipped with n degrees of freedom, which sustains a head equipped with m degrees of freedom respect to the arm, and an accumulation table for the containers to be palletised, the head being a drawing head, which is comprised of a drawing frame equipped with a device to move horizontally with respect to the head and a supporting platform placed under the drawing frame; equipped with a device to move horizontally with respect to the head. Applicable in the glass industry.

6 Claims, 4 Drawing Sheets

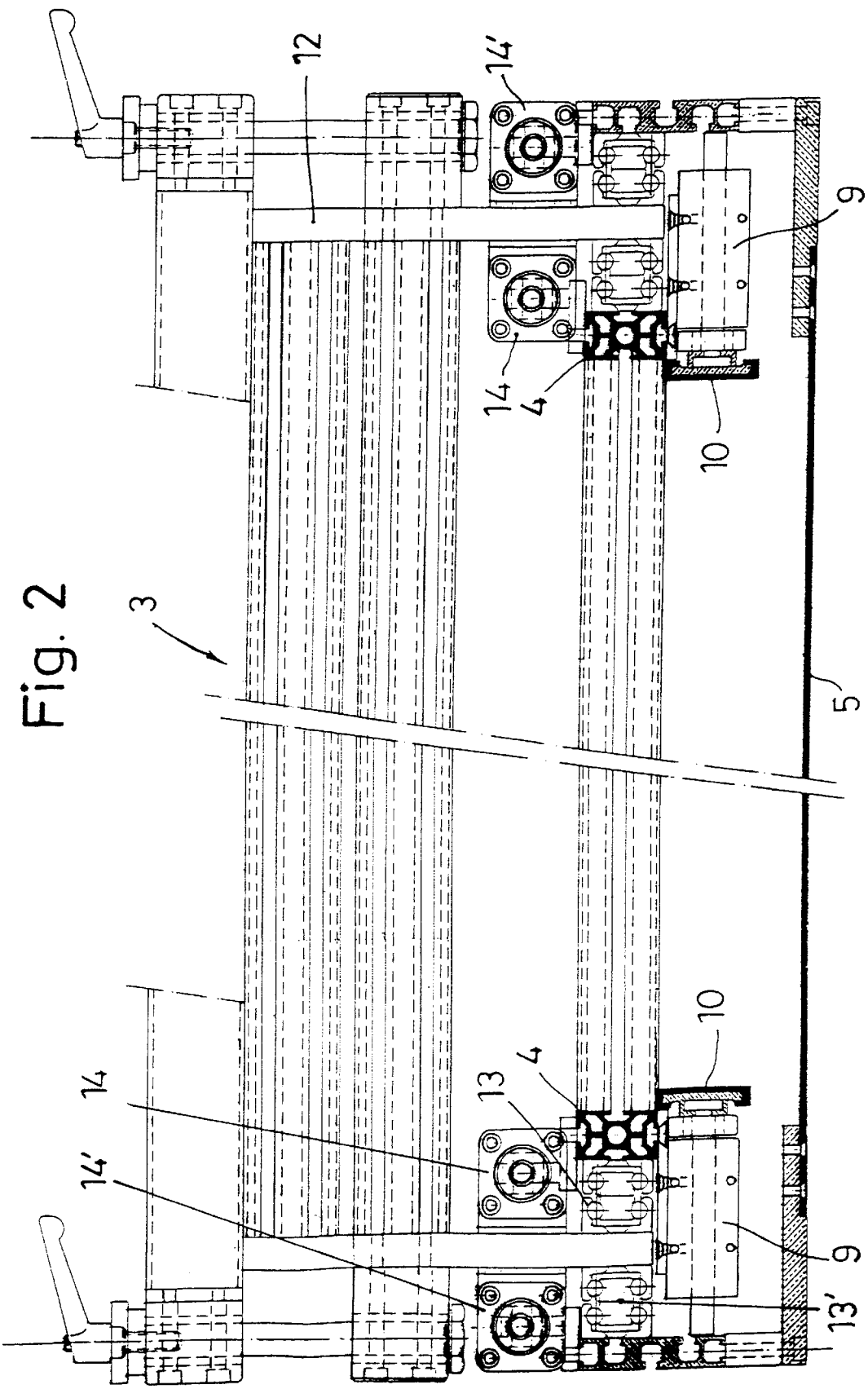

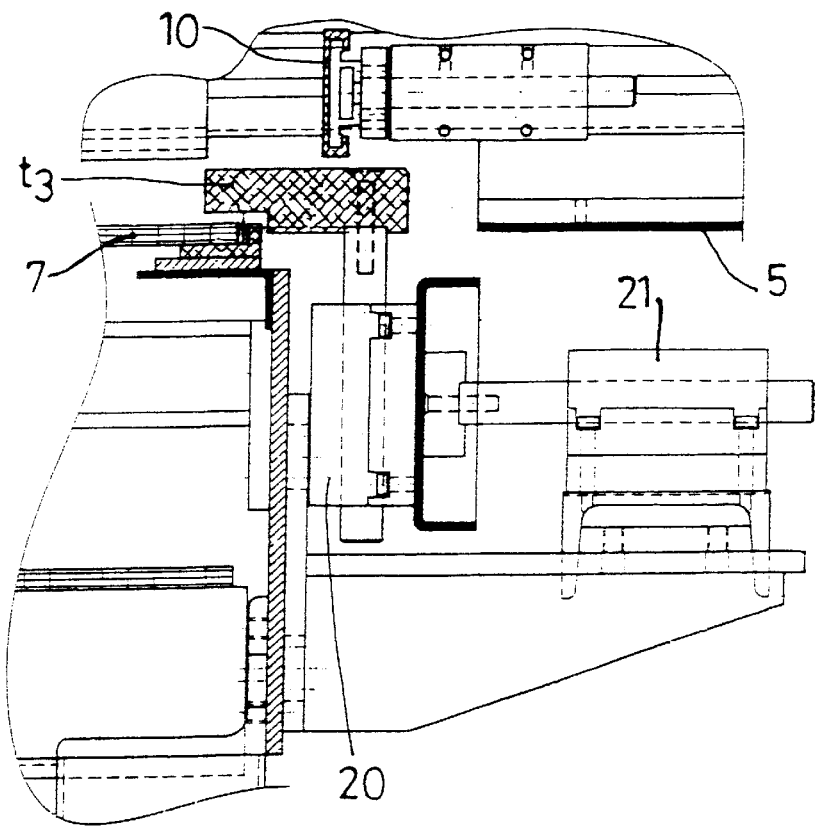
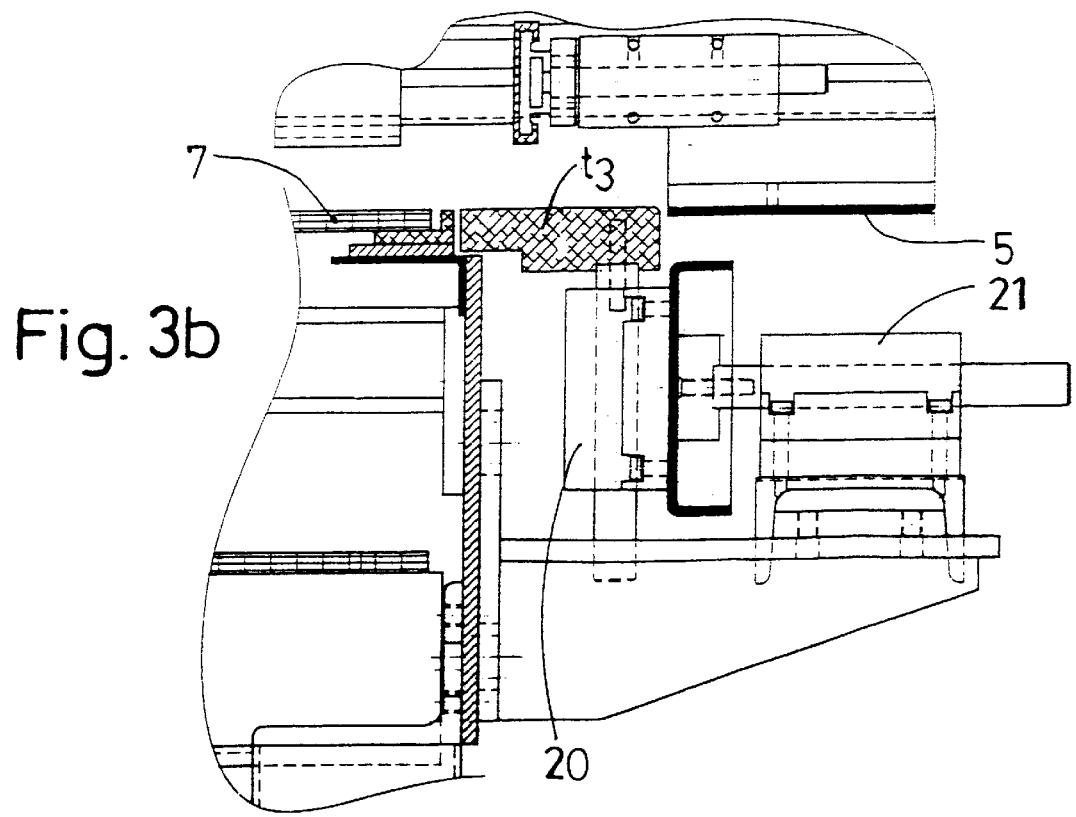

CONTAINER PALLETISER

A container palletiser is comprised of an accumulation table where the containers to be palletised are accumulated and a press assembly comprised of a transporter arm coupled to which is a head, which transports the containers from the accumulation table to a pallet.

A problem has arisen with the container palletisers, due to the community standardisation on hygiene and health, which forbids any contact of the container handling elements with the edges and useful parts; that is, with the edges-areas that may later come into contact, for example, with the users' lips or the packed product.

The applicant has developed a palletiser that overcomes the aforementioned problem on managing to transfer the containers from one location to another by drawing the containers, by making the head into a drawing head. The latter is the basic object of this invention.

This invention advocates a palletiser that is comprised of an arm equipped with n degrees of freedom, which sustains a head equipped with m degrees of freedom relative to the arm, and of an accumulation table for the containers to be palletised. It is characterised by the head being a drawing head, which is comprised of:

a) a drawing frame equipped with means to move horizontally with respect to the head;

b) a supporting platform placed under the drawing frame; equipped with means to move horizontally with respect to the head.

It is also characterised because the drawing frame has mobile containment sides that can move it towards the inside of this drawing frame.

It is also characterised because the mobile containment sides are arranged below the drawing frame.

It is also characterised because the drawing head is comprised of a frame, secured to which are first and second guides, which the drawing frame and the supporting platform slide upon, respectively.

It is also characterised because the accumulation table has several stops for the containers, at least one of these stops having the means for its horizontal and/or vertical movement with respect to the accumulation table.

In order to have a better understanding of the object of this invention, a special form of practical execution is shown in the drawings, susceptible to incidental changes, which will not alter the basics.

FIG. 2 is a cross section of the drawing head (3) of the palletiser of FIG. 1.

FIG. 3a is an illustration of the mobile stop ($t_3$) in the stop position for the containers (3).

FIG. 3b is an illustration of the mobile stop ($t_3$) in the table level position (7).

Below an example of a non-limiting, practical execution of this invention is described.

It has an accumulation table (7) whose object is to form a bed (6) of containers (e) (for example by conveyor belt) which accumulates the containers (e) to be palletised.

In order for the containers (e) not to fall over the edges and for the bed of containers (6) not to become deformed, there are stops (t), at least one of which, according to the invention, is mobile, as explained later.

Figure 1:
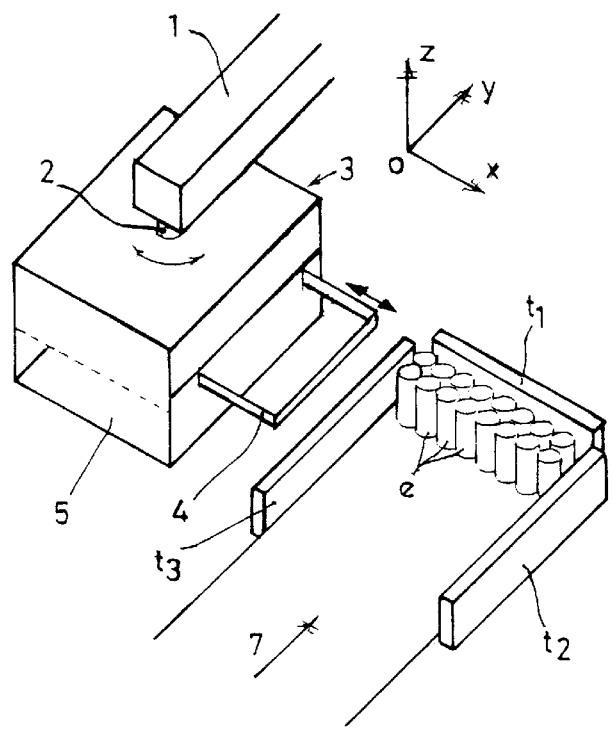
FIG. 1 is a diagram of a practical execution of the palletiser, the object of the invention.

In this specific case it has been arranged for the final stop ($t_1$) and the right side ($t_2$) (according to FIG. 1) to be fixed and the left side stop ($t_3$) to be mobile.

There is an arm (1) equipped with n degrees of freedom, which in this case is a translation one according to axes OX, OZ, and a head (3), which is joined to the arm (1) with a coupling device (2), and which makes it possible for the head (3) to have m degrees of freedom, which in this case is of rotation in X OY plane.

The drawing head (3), which is the main object of the invention, is comprised (FIG. 2) of a frame (12), which supports:

a drawing frame (4) which can slide horizontally on some first guides (13) of the frame under the action of some first pneumatic cylinders (14);

a supporting platform (5) placed under the drawing frame (4) which can slide horizontally on some second guides (13') of the frame (12) under the action of some second pneumatic cylinders (14').

The drawing frame (4) has a mobile containment side (10) on each of its sides, which can move towards the inside of the drawing frame (4) under the action of some third pneumatic cylinders (9).

The mobile sides (10) will preferably be under the drawing frame (4) in order to be able to fulfil its function better.

The mobile stop ($t_3$) has a pneumatic cylinder (20), which allows it an upward/downward movement along the OZ axis and a pneumatic cylinder (21), which allows it a forward/backward movement along the OX axis.

The mobile side stop ($t_3$) in upward-forward position (FIG. 3a) carries out stop functions for the containers (e).

The mobile stop (t3) in down-backward position carries out transmission surface functions between the accumulation table (7) and the supporting platform (5).

Figure 4A:
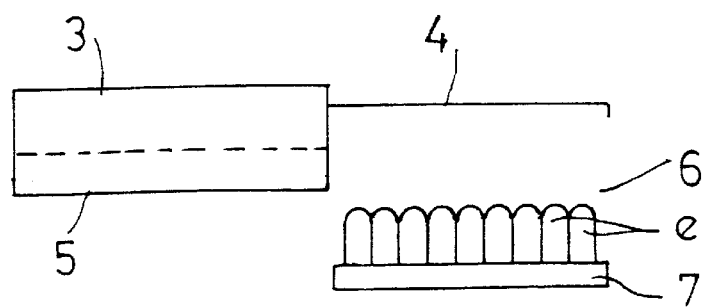
FIGS. 4a, 4b, 4c, 4d, 4e, 4f, 4g and 4h show a diagram of how the palletiser in FIG. 1 operates.

The operation is as follows (the automation is presupposed in accordance with the dimensions and specific characteristics of the palletiser):

The drawing head (3) is positioned so that the drawing frame (4) remains over the bed (6) of containers (e) and centred with respect to this bed (6) (FIG. 4a).

The drawing device (4) must be outside the drawing head (3) before reaching the entry position on the bed (6) of containers (c).

Figure 4B:
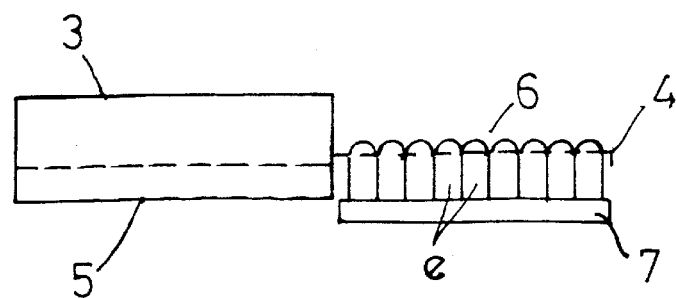

Arm (1) descends (OZ axis) with the head (3) until the platform (5) is at the same level as the surface of the accumulation table (7), bed (6) framing the frame (4) (FIG. 4b).

Figure 4C:
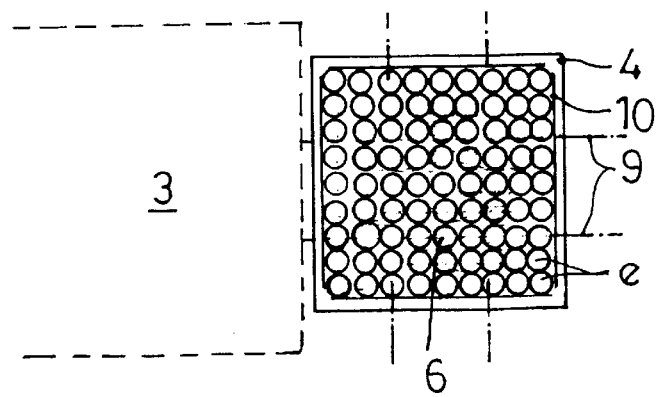

The mobile containment sides (10), which come into contact with the containers (e) are projected, containing/securing the bed (6) (FIG. 4c).

Figure 4D:
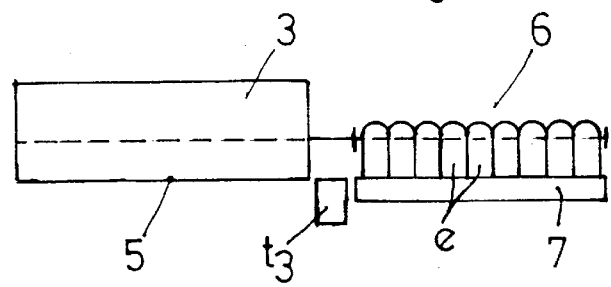

The mobile side stop ($t_3$) is positioned on a level with the accumulation table surface (7) and with the supporting platform (5) (FIG. 4d).

Figure 4E:
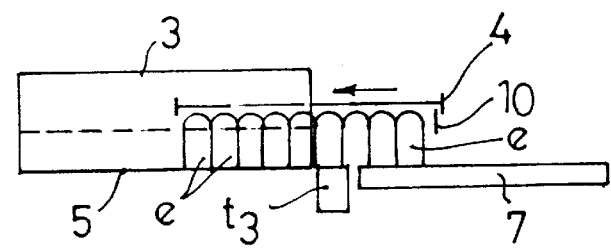

The drawing frame (4) goes back, it slides towards the inside of the head (3), drawing with it the containers (e) on the supporting platform (5) (FIG. 4e).

Figure 4F:
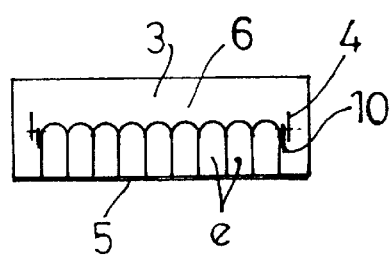

The bed (6) of containers (e) is deposited on the supporting platform (5), following the bed (6) secured/contained by the mobile sides (10) (FIG. 4f).

The drawing head (3) is positioned on a pallet (8).

The supporting platform (5) slides on the horizontal plane on the second guides (13') and the bed (6) slides by gravity from the mobile containment sides (10) to the pallet (8).

Figure 4G:
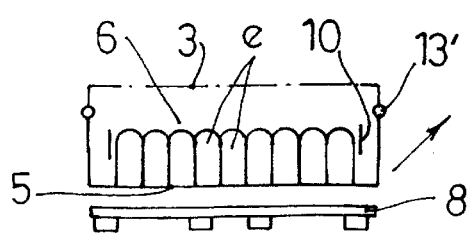

The mobile sides (10) move back returning to their original position (FIG. 4g).

The head (3) rises, the supporting platform (5) returns to its original position and the cycle can begin again.

Figure 4H:
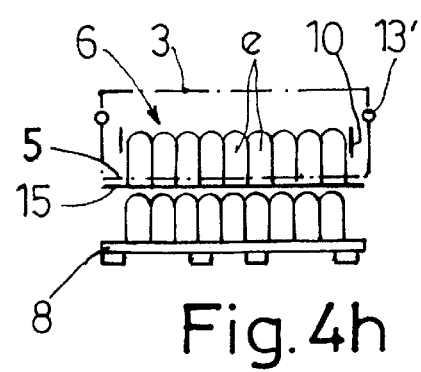

If desired, the drawing frame (4) and/or the mobile sides (10) can be equipped with vertical movements along axis OZ similar to the horizontal ones described.

Where the pallet (8) has been mentioned, it can be replaced with an intercalator (15) so that the beds (6) form several layers (FIG. 4h).

We claim:

1. A system for loading a pallet with a plurality of containers comprising:
   (a) an accumulating table equipped with stops for accumulating a plurality of containers, one of said stops being movable both horizontally and vertically;
   (b) a movable arm which moves between said accumulating table and a pallet, said arm being movable in a horizontal and vertical direction;
   (c) a head pivotally connected to said arm for pivoting in a horizontal plane;
   (d) a horizontally movable draw frame mounted in said head and movable in a horizontal plane away from and into said head for drawing said containers off of said accumulating table and into said head, said frame having four sides;
   (e) four containment sides, one of each containment side being mounted at the bottom of each of said draw frame sides, said containment sides being movable in a horizontal plane inside said draw frame for securing said containers inside said draw frame when said draw frame draws said containers off of said accumulating table; and
   (f) a horizontally movable supporting platform mounted in said head below said draw frame for receiving said containers drawn off of said accumulating table by said draw frame, said supporting platform being movable in a horizontal plane away from and into said head, said supporting platform moving horizontally away from said head to drop said containers onto said pallet when said arm moves said head from said accumulating table to said pallet.

2. The system of claim 1 wherein said movable stop has a pair of pneumatic cylinders for moving said stop both horizontally and vertically so as to allow said draw frame to draw said containers off of said accumulating table and onto said supporting platform.

3. The system of claim 1 wherein said draw frame is movably connected to said head by means of a pair of first guides and first pneumatic cylinders.

4. The system of claim 1 wherein said supporting platform is movably connected to said head by means of a pair of second guides and second pneumatic cylinders.

5. The system of claim 1 wherein said containment sides are movably connected to said draw frame by means of third pneumatic cylinders.

6. The system of claim 1 wherein said draw frame is movably connected to said head by means of a pair of first guides and first pneumatic cylinders; said supporting platform is movably connected to said head by means of a pair of second guides and second pneumatic cylinders; and said containment sides are movably connected to said draw frame by means of third pneumatic cylinders.

* * * * *